(12) United States Patent
Kim et al.

(10) Patent No.: US 7,466,080 B2
(45) Date of Patent: Dec. 16, 2008

(54) FLAT-TYPE FLUORESCENT LAMP AND LIQUID CRYSTAL DISPLAY DEVICE HAVING THE SAME

(75) Inventors: Hyoung-Joo Kim, Uiwang-si (KR); Sang-Yu Lee, Yongin-si (KR)

(73) Assignee: Samsung Electronics, Co., Ltd., Kyungki-do (KR)

( * ) Notice: Subject to any disclaimer, the term of this patent is extended or adjusted under 35 U.S.C. 154(b) by 17 days.

(21) Appl. No.: 11/262,116

(22) Filed: Oct. 27, 2005

(65) Prior Publication Data

US 2006/0145579 A1    Jul. 6, 2006

(30) Foreign Application Priority Data

Jan. 4, 2005    (KR) .................. 10-2005-0000534

(51) Int. Cl.
*H01J 17/04*    (2006.01)
*H01J 11/00*    (2006.01)

(52) U.S. Cl. ...................... 313/631; 313/607
(58) Field of Classification Search ............... 313/234, 313/607, 594, 166, 246, 368, 446, 609–610, 313/627–643; 329/368
See application file for complete search history.

(56) References Cited

U.S. PATENT DOCUMENTS

| | | | | |
|---|---|---|---|---|
| 4,920,298 A | * | 4/1990 | Hinotani et al. ............. | 313/493 |
| 5,461,279 A | * | 10/1995 | Hasegawa ................... | 313/493 |
| 5,525,861 A | * | 6/1996 | Banno et al. ................ | 313/495 |
| 6,034,470 A | * | 3/2000 | Vollkommer et al. ....... | 313/485 |
| 6,294,867 B1 | * | 9/2001 | Lynn ........................... | 313/422 |
| 6,373,185 B1 | * | 4/2002 | Tyler ........................... | 313/491 |
| 6,583,556 B2 | * | 6/2003 | Oishi et al. .................. | 313/495 |
| 7,154,225 B2 | * | 12/2006 | Kim et al. .................... | 313/609 |
| 2002/0131554 A1 | * | 9/2002 | Fleming et al. ............. | 378/119 |
| 2003/0214478 A1 | * | 11/2003 | Yoo et al. .................... | 345/102 |
| 2005/0116607 A1 | * | 6/2005 | Park et al. ................... | 313/485 |
| 2005/0285533 A1 | * | 12/2005 | Park et al. ................... | 313/610 |
| 2006/0006805 A1 | * | 1/2006 | Son et al. .................... | 313/607 |

* cited by examiner

*Primary Examiner*—Nimeshkumar D. Patel
*Assistant Examiner*—Anne M Hines
(74) *Attorney, Agent, or Firm*—Macpherson Kwok Chen & Heid LLP; Mark A. Pellegrini

(57) ABSTRACT

A flat-type fluorescent lamp includes a lamp body and a first external electrode. The first external electrode is positioned on an end portion of the lamp body. The first external electrode includes a main electrode portion and a first auxiliary electrode portion. The main electrode portion crosses end portions of the discharge spaces. The first auxiliary electrode portion protrudes from the main electrode portion. The first auxiliary electrode portion corresponds to an outer discharge space adjacent to a side of the lamp body. Therefore, a luminance of the flat-type fluorescent lamp may be made more uniform, thereby improving an image display quality. In addition, operation of the flat-type fluorescent lamp at a low temperature may be improved.

26 Claims, 9 Drawing Sheets

FLAT-TYPE FLUORESCENT LAMP AND LIQUID CRYSTAL DISPLAY DEVICE HAVING THE SAME

CROSS-REFERENCE TO RELATED APPLICATIONS

The present application claims priority from Korean Patent Application No. 2005-00534, filed on Jan. 4, 2005, the disclosure of which is hereby incorporated herein by reference in its entirety.

BACKGROUND

1. Field of the Invention

The present invention relates to a flat-type fluorescent lamp and a liquid crystal display (LCD) device having the flat-type fluorescent lamp. More particularly, the present invention relates to a flat-type fluorescent lamp capable of providing uniform luminance and an LCD device including the flat-type fluorescent lamp.

2. Description of the Related Art

An LCD device displays an image using a liquid crystal layer having optical characteristics such as anisotropy of refractivity and electrical characteristics such as anisotropy of dielectric constant. LCD devices can provide various desirable characteristics over cathode ray tube (CRT) or plasma display panel (PDP) devices, such as a thin profile, lower driving voltage, and lower power consumption.

An LCD panel is non-emissive type display device which requires a light source to supply the LCD panel of the LCD device with light for producing visible images.

The typical LCD device includes a cold cathode fluorescent lamp CCFL having a thin cylindrical shape that is extended in a predetermined direction. An LCD device having a large viewing area typically includes a plurality of CCFLs. As the number of CCFLs in the LCD device is increased, the manufacturing cost of the LCD device also increases, and optical characteristics such as luminance uniformity may be adversely affected.

Accordingly, a flat-type fluorescent lamp has been developed. The flat-type fluorescent lamp includes a lamp body having a plurality of discharge spaces and an external electrode through which a discharge voltage is applied to the lamp body. An inverter applies the discharge voltage to the external electrode to form a plasma discharge in the discharge spaces. An ultraviolet light generated in the discharge spaces is converted into a visible light by a fluorescent layer formed on an inner surface of the lamp body.

During operation of the flat-type fluorescent lamp, the luminance of the outer discharge spaces is lower than that of the central discharge spaces. The luminance difference is created by a parasitic capacitance between the flat-type fluorescent lamp and a metal receiving container. In addition the plasma discharge is not generated in the outer discharge spaces at low temperatures. As a result, the luminance uniformity and image display quality may be adversely affected.

SUMMARY

In accordance with the present invention, a flat-type fluorescent lamp capable of providing uniform light luminance is provided.

In accordance with the present invention, a liquid crystal display (LCD) device having the above-mentioned flat-type fluorescent lamp is also provided.

A flat-type fluorescent lamp in accordance with an aspect of the present invention includes a lamp body and a first external electrode. The lamp body includes a plurality of discharge spaces for generating light. The first external electrode is positioned on an end portion of the lamp body through which a discharge voltage is applied. The first external electrode includes a main electrode portion and a first auxiliary electrode portion. The main electrode portion crosses end portions of the discharge spaces. The first auxiliary electrode portion protrudes from the main electrode portion. The first auxiliary electrode portion corresponds to an outer discharge space adjacent to a side of the lamp body.

A flat-type fluorescent lamp in accordance with another aspect of the present invention includes a lamp body, a first external electrode, and a floating electrode. The lamp body includes a plurality of discharge spaces for generating light. The first external electrode is positioned on an end portion of the lamp body through which a discharge voltage is applied. The first external electrode includes a main electrode portion and an auxiliary electrode portion. The main electrode portion crosses end portions of the discharge spaces. The auxiliary electrode portion protrudes from the main electrode portion. The auxiliary electrode portion corresponds to an outer discharge space adjacent to a side of the lamp body. The floating electrode member is spaced apart from the auxiliary electrode portion. The floating electrode member has a shorter width than the auxiliary electrode portion.

An LCD device in accordance with an exemplary embodiment of the present invention includes a flat-type fluorescent lamp, a receiving container, an inverter, and an LCD panel. The flat-type fluorescent lamp includes a lamp body and a first external electrode. The lamp body includes a plurality of discharge spaces for generating light. The first external electrode is positioned on an end portion of the lamp body through which a discharge voltage is applied. The first external electrode includes a main electrode portion and a first auxiliary electrode portion. The main electrode portion crosses end portions of the discharge spaces. The first auxiliary electrode portion protrudes from the main electrode portion. The first auxiliary electrode portion corresponds to an outer discharge space adjacent to a side of the lamp body. The receiving container receives the flat-type fluorescent lamp. The inverter applies the discharge voltage to the flat-type fluorescent lamp. The LCD panel displays an image using the light generated from the flat-type fluorescent lamp.

As a result, the luminance of the outer discharge spaces may be increased so that the luminance of the flat-type fluorescent lamp is made more uniform, thereby improving the image display quality. In addition, operation of the flat-type fluorescent lamp at a low temperature may be improved.

BRIEF DESCRIPTION OF THE DRAWINGS

The above and other advantages of the present invention will become more apparent by describing in detail exemplary embodiments thereof with reference to the accompanying drawings, in which.

DESCRIPTION OF THE EMBODIMENTS

It should be understood that the exemplary embodiments of the present invention described herein may be varied and modified in many different ways without departing from the inventive principles disclosed herein, and the scope of the present invention is therefore not limited to these particular embodiments. Rather, these embodiments are provided so that this disclosure will be thorough and complete, and will fully convey the invention to those skilled in the art by way of example and not of limitation.

Hereinafter, the present invention will be described in detail with reference to the accompanying drawings.

Figure 1:
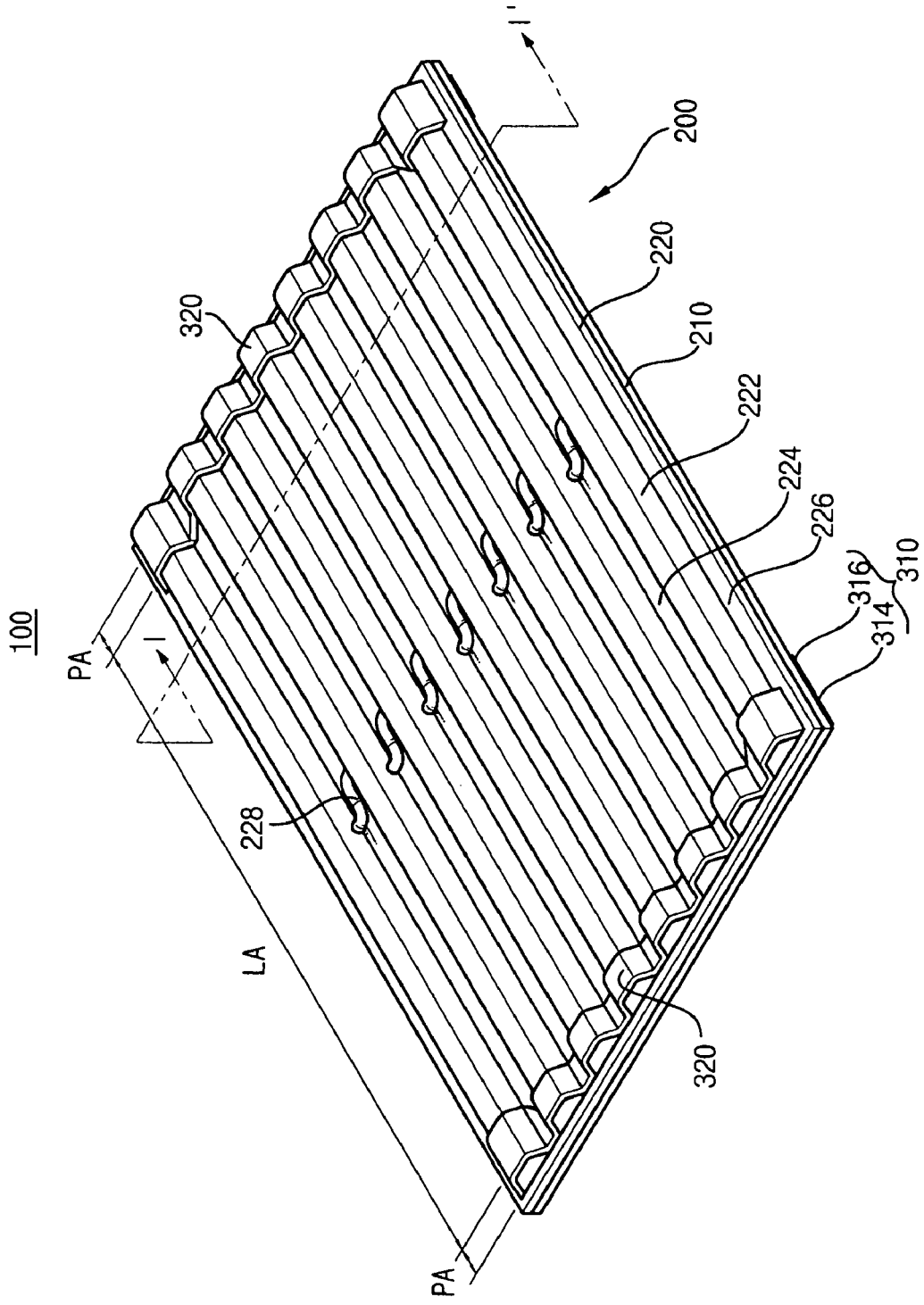
FIG. 1 is a perspective view showing a flat-type fluorescent lamp in accordance with an exemplary embodiment of the present invention.
Figure 2:
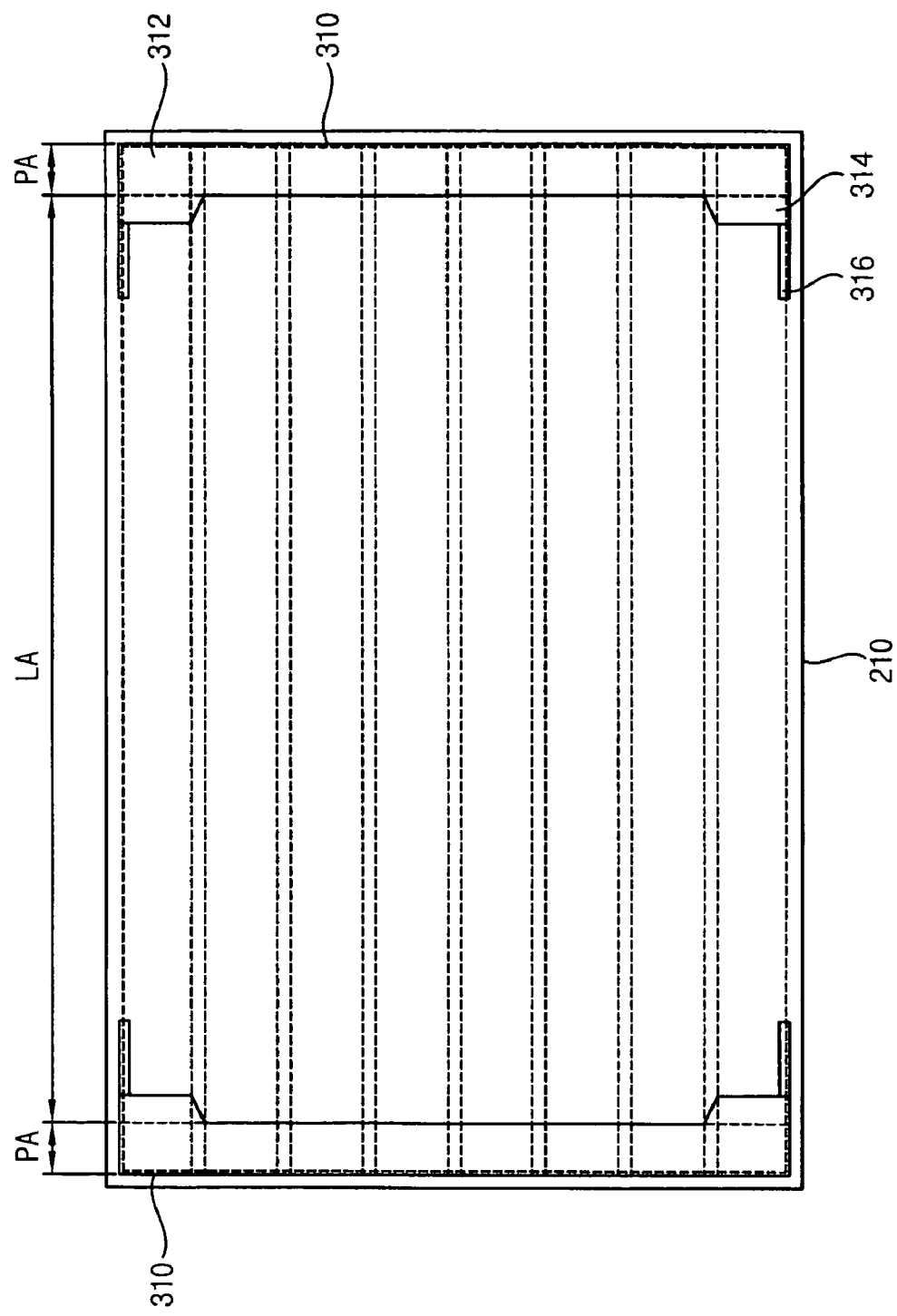
FIG. 2 is a plan view showing the flat-type fluorescent lamp shown in FIG. 1.

FIG. 1 is a perspective view showing a flat-type fluorescent lamp in accordance with an exemplary embodiment of the present invention. FIG. 2 is a plan view showing the flat-type fluorescent lamp shown in FIG. 1.

Referring to FIGS. 1 and 2, the flat-type fluorescent lamp 100 includes a lamp body 200 and a first external electrode 310. In this exemplary embodiment, the flat-type fluorescent lamp 100 includes two first external electrodes 310. The lamp body 200 is divided into a plurality of discharge spaces. Light is generated in the discharge spaces. A discharge voltage is applied from an inverter (not shown) to the lamp body 200 through the first external electrodes 310.

The lamp body 200 has a substantially rectangular shape when viewed from a plan view of the flat-type fluorescent lamp 100. When the discharge voltage is applied to the lamp body 200 through the first external electrodes 310, a plasma discharge is formed. Ultraviolet light generated by the plasma discharge is converted into light in the visible spectrum so that the flat-type fluorescent lamp 100 emits visible light. The lamp body 200 includes a light emitting area LA and one or more peripheral areas PA adjacent the ends of light emitting area LA. Light is generated in the light emitting area LA. The peripheral areas are defined by the portions of the second substrate 220 which are covered by the second external electrodes 320. The lamp body 200 has a wide light emitting area LA, and the lamp body 200 includes discharge spaces so that a uniform luminance of visible light may be produced, and a light emitting efficiency of the flat-type fluorescent lamp 100 is increased with respect to a conventional cold cathode fluorescent lamp (CCFL). The lamp body 200 includes a first substrate 210 and a second substrate 220.

The first external electrodes 310 are provided on a lower surface of the first substrate 210. Thus, the first external electrodes 310 are on an external surface of the lamp body 200. Each of the first external electrodes 310 is positioned on end portions of the discharge spaces, and crosses laterally across the end portions of the discharge spaces.

Each of the first external electrodes 310 comprises a main electrode portion 312 in the peripheral area PA, a first auxiliary electrode portion 314 in the light emitting area LA, and a second auxiliary electrode portion 316 in the light emitting area LA. The main electrode portion 312 has uniform a width, and crosses the end portions of all of the discharge spaces. The first auxiliary electrode portion 314 corresponds to an end portion of an outer discharge space, and protrudes from the main electrode portion 312 toward a center of the outer discharge space. The second auxiliary electrode portion 316 protrudes from the first auxiliary electrode portion 314 toward the center of the outer discharge space. The second auxiliary electrode portion 316 is adjacent an edge of the lamp body 200 and extends along a lower edge of the first substrate 210.

Each of the first external electrodes 310 comprises a conductive material so that the discharge voltage is applied from the inverter to the lamp body 200 through the first external electrode 310. In this exemplary embodiment, a silver paste comprising a mixture of silver (Ag) and silicon oxide ($SiO_2$) is coated on the lamp body 200 to form the first external electrodes 310. Alternatively, metal powder may be coated on the lamp body 200 to form the first external electrodes 310.

The flat-type fluorescent lamp 100 may further include second external electrodes 320. The second external electrodes 320 are provided on an upper surface of the second substrate 220. Thus, the second external electrodes 320 are on an upper external surface of the lamp body 200. Each of the second external electrodes 320 is provided on the end portions of the discharge spaces opposite the first external electrodes 310. In this exemplary embodiment, the second external electrodes 320 do not include extensions corresponding to the second auxiliary electrode 316 of the first external electrodes 310. That is, each of the second external electrodes 320 has a shape which only corresponds to the main electrode portion 312 and the first auxiliary electrode portion 314 of the first external electrodes 310. The second external electrodes 320 may comprise the same material and may be formed using the same method as the first external electrodes 310.

Figure 3:
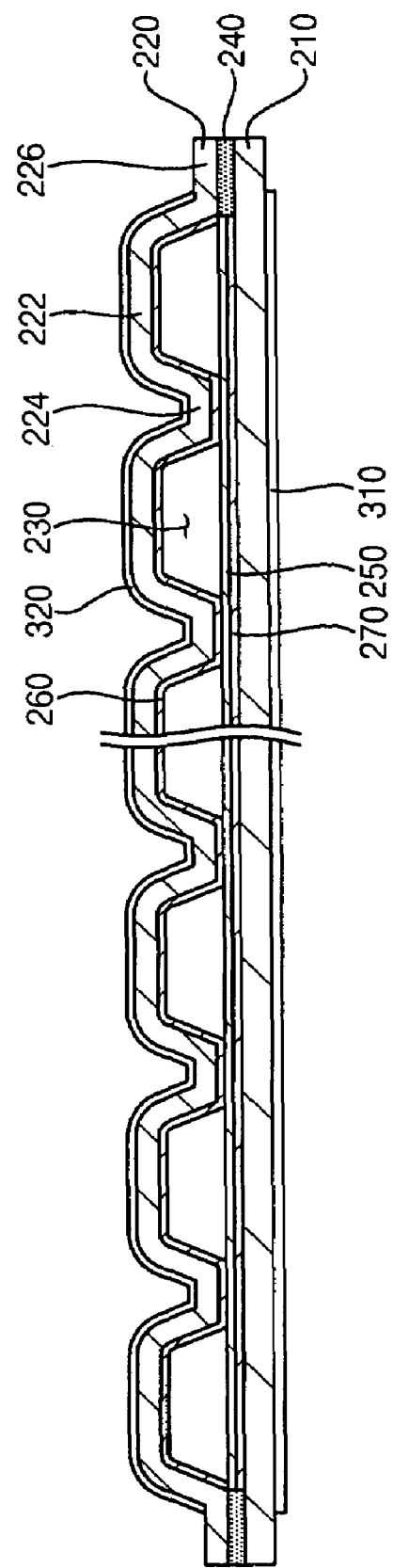
FIG. 3 is a cross-sectional view taken along a line I-I' shown in FIG. 1.

FIG. 3 is a cross-sectional view taken along a line I-I' shown in FIG. 1.

Referring to FIGS. 1 and 3, the flat-type fluorescent lamp 100 includes the lamp body 200, the first external electrodes 310 that are positioned on the bottom of the lamp body 200, and the second external electrodes 320 that are positioned on the top of the lamp body 200.

The lamp body 200 includes the first substrate 210 on which the first external electrode 310 is formed and the second substrate 220 that is combined with the first substrate 210 to form the discharge spaces 230.

The first substrate 210 has a substantially rectangular plate shape. In this exemplary embodiment, the first substrate 210 comprises a glass including a material that blocks UV light.

The second substrate 220 comprises a material transparent to light in the visible spectrum so that visible light may pass through the second substrate 220. For example, the second substrate 220 may also comprise a glass including a material that blocks UV light.

The second substrate 220 includes a plurality of discharge space portions 222, a plurality of space dividing portions 224, and a sealing portion 226. The discharge space portions 222 are spaced apart from the first substrate 210 to form the discharge spaces 230 between the first substrate 210 and the second substrate 220. The space dividing portions 224 are located between the discharge space portions 222, and make contact with the first substrate 210 to define sides of the discharge spaces 230. The sealing portion 226 is adjacent to the edges of the second substrate 220 to form a seal with the first substrate 210 along the sides of the second substrate 220. The sealing portion 226 surrounds the discharge space portions 222 and the space dividing portions 224.

The second substrate 220 may be formed through a molding process. That is, a glass plate is heated and pressed to form the second substrate 220 having the discharge space portions 222, the space dividing portions 224, and the sealing portion 226. Alternatively, the second substrate 220 may be formed through a blow molding process. In the blow molding process, a glass plate is heated and molded using compressed air to form the second substrate 220.

As shown in FIG. 3, the cross-sectional view of the lamp body 200 shows that the second substrate 220 forms a plurality of connected trapezoidal shapes. Each of these trapezoidal shapes form the walls of the discharge space portions 222. The trapezoidal shapes have rounded corners, and are arranged substantially parallel to each other. Alternatively, the cross-section of the discharge space portions 222 may have a semicircular shape, a rectangular shape, a polygonal shape, etc.

A connecting passage 228 is formed on the second substrate 220 to connect adjacent discharge spaces 230. In this exemplary embodiment, at least one connecting passage 228 is formed on each of the space dividing portions 224. Each of the connecting passages 228 is spaced apart from the first substrate 210 by a predetermined distance. The connecting passages 228 may be formed through the molding process for forming the second substrate 220. The discharge gas that is injected into one of the discharge spaces 230 may pass through each of the connecting passages 228 so that pressure in the discharge spaces 230 is substantially equal to one another. Each of the connecting passages 228 may be formed in a variety of shapes, such as a curved 'S' shape. When each of the connecting passages 228 has the 'S' shape, a path length between the adjacent discharge spaces 230 is increased so that a current formed by the discharge voltage flows more uniformly through the discharge spaces 230.

An adhesive 240 such as frit is interposed between the first and second substrates 210 and 220 to bond the first substrate 210 with the second substrate 220. The frit may comprise a mixture of glass and metal having a melting point lower than pure glass. Thus, the adhesive 240 is prepared on the sealing portion 226 of the first and second substrates 210 and 220, and the adhesive 240 is fired and solidified. The adhesive 240 is fired at a temperature of about 400° C. to about 600° C., which causes the frit adhesive 240 to melt, but not melt the glass forming the first and second substrates 210 and 220. When the adhesive 240 is allowed to solidify, the frit will solidly bond the first and second substrates 210 and 220.

The space dividing portions 224 of the second substrate 220 are sealed with the first substrate 210 by a pressure difference between the discharge spaces 230 and outside of the flat-type fluorescent lamp 100. In particular, the first substrate 210 is combined with the second substrate 220, and the air between the first and second substrates 210 and 220 is discharged causing the discharge spaces 230 to be evacuated. A discharge gas is injected into the evacuated discharge spaces 230. In this exemplary embodiment, a pressure of the discharge gas in the discharge spaces 230 is about 50 Torr to 70 Torr, and an atmospheric pressure outside of the flat-type fluorescent lamp 100 is about 760 Torr, thereby forming the pressure difference. Therefore, the space dividing portions 224 are sealed with the first substrate 210.

The lamp body 200 further includes a first fluorescent layer 250 and a second fluorescent layer 260. The first fluorescent layer 250 is provided on an upper surface of the first substrate 210, such that the first fluorescent layer 250 covers the lower walls of the discharge spaces 230. The second fluorescent layer 260 is provided on a lower surface of the second substrate 220, such that the second fluorescent layer 260 covers the upper and side walls of the discharge spaces 230. When the ultraviolet light generated by the plasma discharge is irradiated onto the first and second fluorescent layers 250 and 260, excitons are generated in the first and second fluorescent layers 250 and 260. When an energy level of the excitons decreases, the first and second fluorescent layers 250 and 260 emit light in the visible spectrum.

The lamp body 200 further includes a reflecting layer 270 interposed between the first substrate 210 and the first fluorescent layer 250. A portion of the visible light is reflected from the reflecting layer 270 toward the second substrate 220 to prevent the visible light generated by the first and second fluorescent layers 250 and 260 from leaking through the first substrate 210. In this exemplary embodiment, the reflecting layer 270 comprises a metal oxide such as aluminum oxide ($Al_2O_3$) or barium sulfate ($BaSO_4$) to increase a light reflectivity of the reflecting layer 270 and a color reproducibility of a display device incorporating the flat-type fluorescent lamp 100.

The first fluorescent layer 250 and the reflecting layer 270 may be formed on the first substrate 210, and the second fluorescent layer 260 may be formed on the second substrate 220 through a spray coating method. In this exemplary embodiment, the first fluorescent layer 250 and the reflecting layer 270 are formed on the upper surface of the first substrate 210 surrounded by the sealing portion 226, and the second fluorescent layer 260 is formed on the lower surface of the second substrate 220 surrounded by the sealing portion 226. Alternatively, the first and second fluorescent layers 250 and 260 and the reflecting layer 270 may not be formed between the space dividing portions 224 and the first substrate 210.

The lamp body 200 may further include a protecting layer (not shown) between the first substrate 210 and the reflecting layer 270 and/or between the second substrate 220 and the second fluorescent layer 260. The protecting layer (not shown) prevents a chemical reaction between mercury (Hg) in the discharge gas and the first or second substrate 210 or 220 to prevent a loss of the mercury and to reduce black spots from forming on the inner surface of the lamp body 200.

Figure 4:
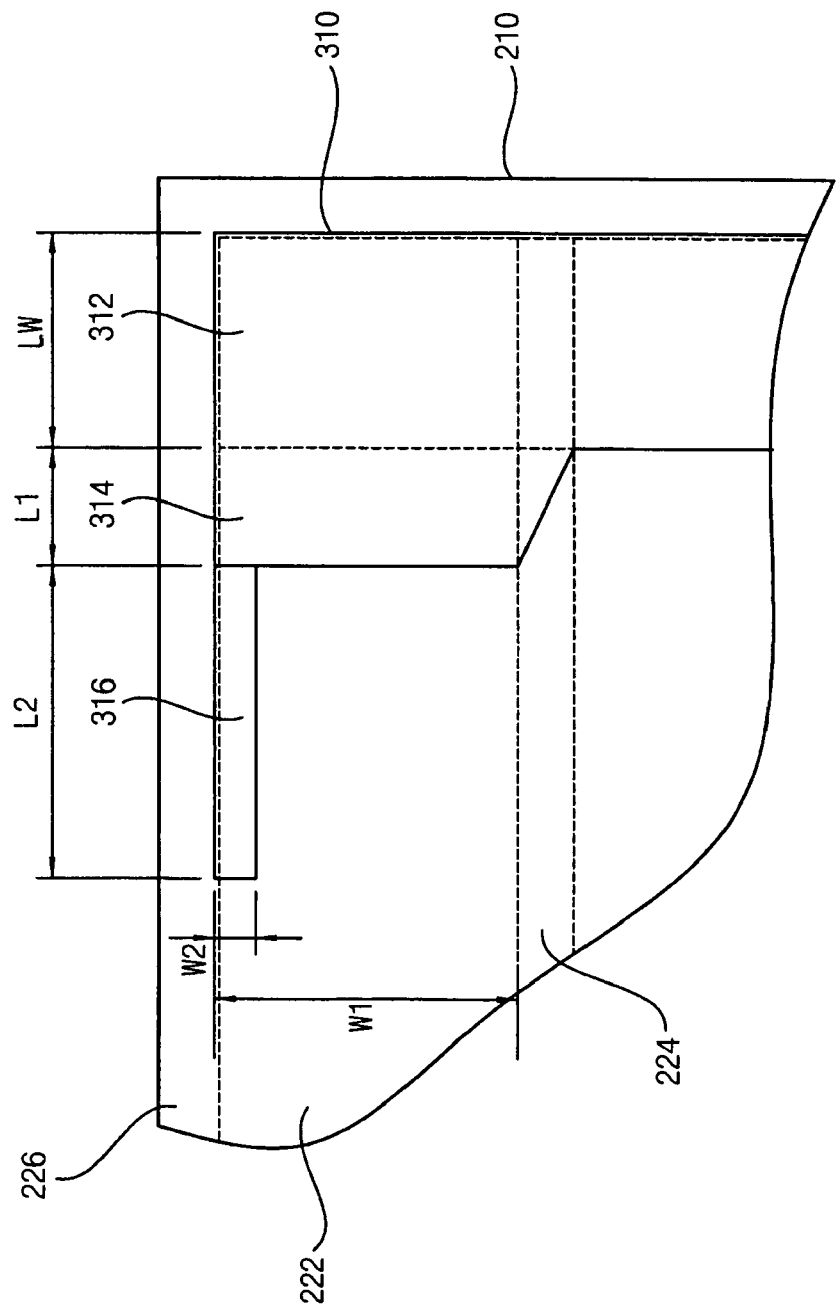
FIG. 4 is an enlarged plan view showing a first external electrode shown in FIG. 2.

FIG. 4 is an enlarged plan view showing a portion of the first external electrode shown in FIG. 2.

Referring to FIG. 4, each of the first external electrodes 310 includes the main electrode portion 312 that crosses the end portions of the discharge spaces, the first auxiliary electrode portion 314 protruding from the main electrode portion 312, and the second auxiliary electrode portion 316 protruding from the first auxiliary electrode portion 314.

The main electrode portion 312 extends in a direction substantially perpendicular to a longitudinal direction of each of the discharge spaces. The main electrode portion 312 has a substantially uniform width LW. In this exemplary embodiment, the main electrode portion 312 has a width LW of about 10 mm.

The first auxiliary electrode portion 314 corresponds to each of the end portions of the outer discharge spaces. When the flat-type fluorescent lamp 100 is received in a metallic receiving container, the outer discharge spaces make contact with bottom plate and sidewalls of the receiving container. As a result, the parasitic capacitance of the outer discharge spaces is greater than a parasitic capacitance of the remaining inner discharge spaces that only make contact with the bottom plate of the receiving container. When the parasitic capacitance is increased, the amount of current from the discharge voltage which flows toward the receiving container is also increased, thereby decreasing the luminance of the light generated in the outer discharge spaces.

The end portions of each of the first external electrodes 310 includes a first auxiliary electrode portion 314 to increase the overlapping area between the first external electrode 310 and the outer discharge spaces. In FIGS. 1 to 4, the first auxiliary electrode portion 314 overlaps with a portion of the light emitting area LA of the flat-type fluorescent lamp 100. Alternatively, the first auxiliary electrode portion 314 may be partially overlapped with the light emitting area LA, or the first auxiliary electrode portion 314 may be in the peripheral area PA. The first auxiliary electrode portion 314 protrudes from the main electrode portion 312 toward the center of each of the outer discharge spaces by a first length L1. When the first length L1 is increased, the luminance of the light generated in the outer discharge spaces is also increased. However, when the first length L1 is too long, the light generated in the outer discharge spaces is blocked by the first auxiliary electrode portion 314, thereby decreasing the luminance of the light generated from the outer discharge spaces. In this exemplary embodiment, the first length L1 is about 2 mm to about 3 mm. The first auxiliary electrode portion 314 has a width W1. In this exemplary embodiment, the width W1 of the first auxiliary electrode portion 314 is about 10 mm.

The end portions of each of the first external electrodes 310 includes a second auxiliary electrode portion 316 to further increase the overlapping area between the first external electrode 310 and the outer discharge spaces. In FIGS. 1 to 4, the second auxiliary electrode portion 316 overlaps with the light emitting area LA of the flat-type fluorescent lamp 100. The second auxiliary electrode portion 316 protrudes from the first auxiliary electrode portion 314 toward the center of the outer discharge spaces by a second length L2. The second auxiliary electrode portion 316 increases luminance uniformity of the flat-type fluorescent lamp 100.

As the second length L2 is increased, the luminance of the light generated in the outer discharge spaces also increases. As a result, the luminance of the light generated in each of the outer discharge spaces can be made to be substantially equal to that of the light generated in each of the remaining discharge spaces. In this exemplary embodiment, the second length L2 is more than about 10 mm. The second auxiliary electrode portion 316 has a second width S2 that is shorter than the first width W1. In addition, the second auxiliary electrode portion 316 is positioned along an edge of the first substrate 210 so that the amount of light generated in the outer discharge spaces which is blocked by the second auxiliary electrode portion 316 is minimized. Furthermore, the second auxiliary electrode portion 316 decreases a distance between the first external electrodes 310 on either end of the outer discharge space. As a result, the plasma discharge can be more easily formed in the outer discharge spaces during an initial stage of the operation of the flat-type fluorescent lamp 100. The second auxiliary electrode portion 316 has a smaller width than that of the first auxiliary electrode portion 314, thereby reducing dark spots from forming in the display image.

In this exemplary embodiment, the main electrode portion 312, the first auxiliary electrode portion 314, and the second auxiliary electrode portion 316 comprise substantially the same material. Alternatively, the main electrode portion 312, the first auxiliary electrode portion 314, and the second auxiliary electrode portion 316 may comprise different materials. For example, the first auxiliary electrode portion 314 and/or the second auxiliary electrode portion 316 may comprise a transparent conductive material.

Figure 5:
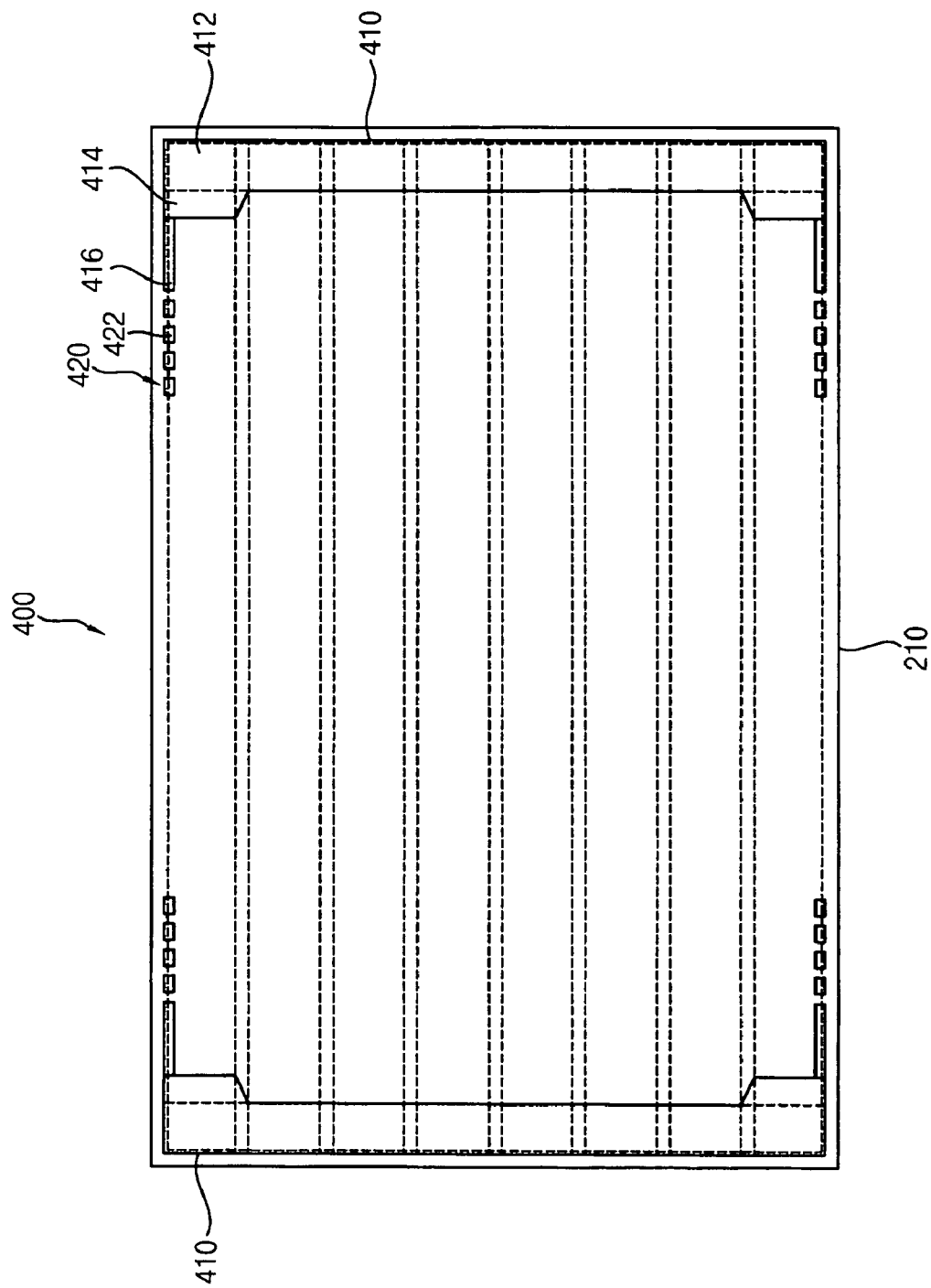
FIG. 5 is a plan view showing a flat-type fluorescent lamp in accordance with another exemplary embodiment of the present invention.
Figure 6:
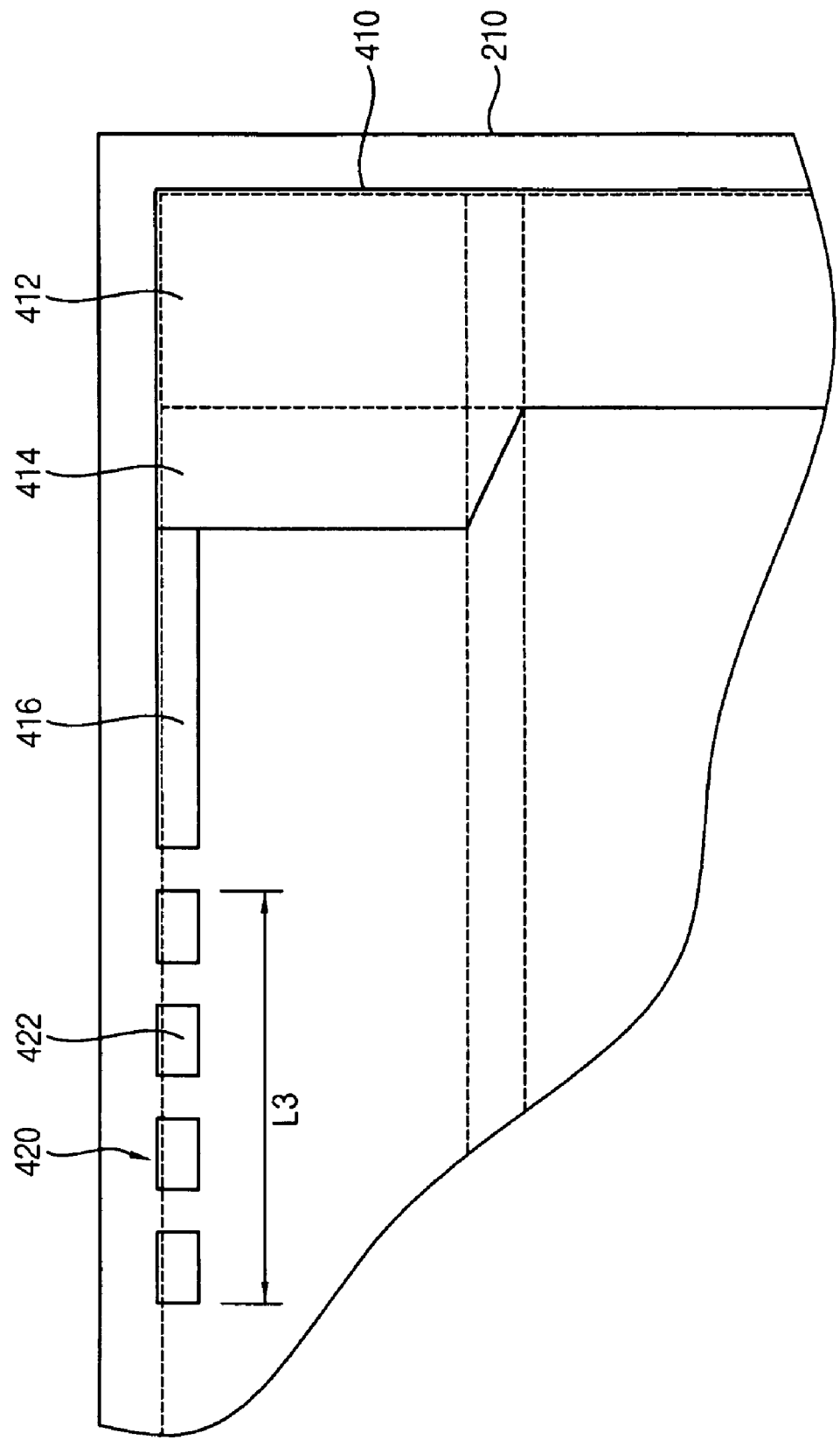
FIG. 6 is an enlarged plan view showing a first external electrode shown in FIG. 5.

FIG. 5 is a plan view showing a flat-type fluorescent lamp in accordance with another exemplary embodiment of the present invention. FIG. 6 is an enlarged plan view showing a first external electrode shown in FIG. 5. The flat-type fluorescent lamp of FIGS. 5 and 6 is substantially the same as in FIGS. 1 to 4 except with respect to the first external electrodes. Thus, the same reference numerals will be used to refer to the same or like parts as those described in FIGS. 1 to 4 and any further explanation concerning the above elements will be omitted.

Referring to FIGS. 5 and 6, the flat-type fluorescent lamp 400 includes first external electrodes 410 that are formed on a lower surface of the first substrate 210 and a floating electrode member 420.

Each of the first external electrodes 410 includes a main electrode portion 412 that crosses end portions of the discharge spaces, a first auxiliary electrode portion 414 which protrudes from the main electrode portion 412, and a second auxiliary electrode portion 416 which protrudes from the first auxiliary electrode portion 414. The main electrode portion 412, the first auxiliary electrode portion 414, and the second auxiliary electrode portion 416 have substantially the same structure as shown in FIG. 4. Thus, any further explanation concerning the above elements will be omitted.

The floating electrode member 420 is spaced apart from the second auxiliary electrode portion 416, and is substantially aligned with the second auxiliary electrode portion 416. The floating electrode member 420 comprises a plurality of floating electrodes 422. The floating electrode member 420 is arranged in a direction parallel to the longitudinal direction of the discharge spaces, and has a third length L3. The third length L3 is long enough to decrease a light initiating temperature of the flat-type fluorescent lamp 400.

In detail, when a discharge voltage is applied to the first external electrodes 410, electric fields are generated between the first external electrodes 410. When the floating electrode member 420 is disposed between the first external electrodes 410, the electric fields becomes stronger because of electrostatic induction of the first external electrodes 410. Therefore, the floating electrode member 420 lowers the light initiating temperature that is lowered when the electric fields between the first external electrodes 410 are strengthened.

In this exemplary embodiment, the third length is no less than about 100 mm. The floating electrode member 420 has a width substantially equal to the width of the second auxiliary electrode portion 416. The floating electrode member 420 is adjacent to the edges of the flat-type fluorescent lamp 400.

The floating electrode member 420 may comprise substantially the same material as the first external electrodes 410. Alternatively, the floating electrode member 420 and the first external electrodes 410 may comprise different materials. For example, the floating electrode member 420 may comprise a transparent conductive material so that the floating electrode member 420 will not block the light generated in the discharge spaces.

According to this exemplary embodiment, an electric field formed in the outer discharge spaces by the floating electrode member 420 is adjacent to a central portion of the outer discharge spaces. As a result, the plasma discharge may be formed at the low temperature. Alternatively, the floating electrode member 420 may be formed in the lamp body 200.

Figure 7:
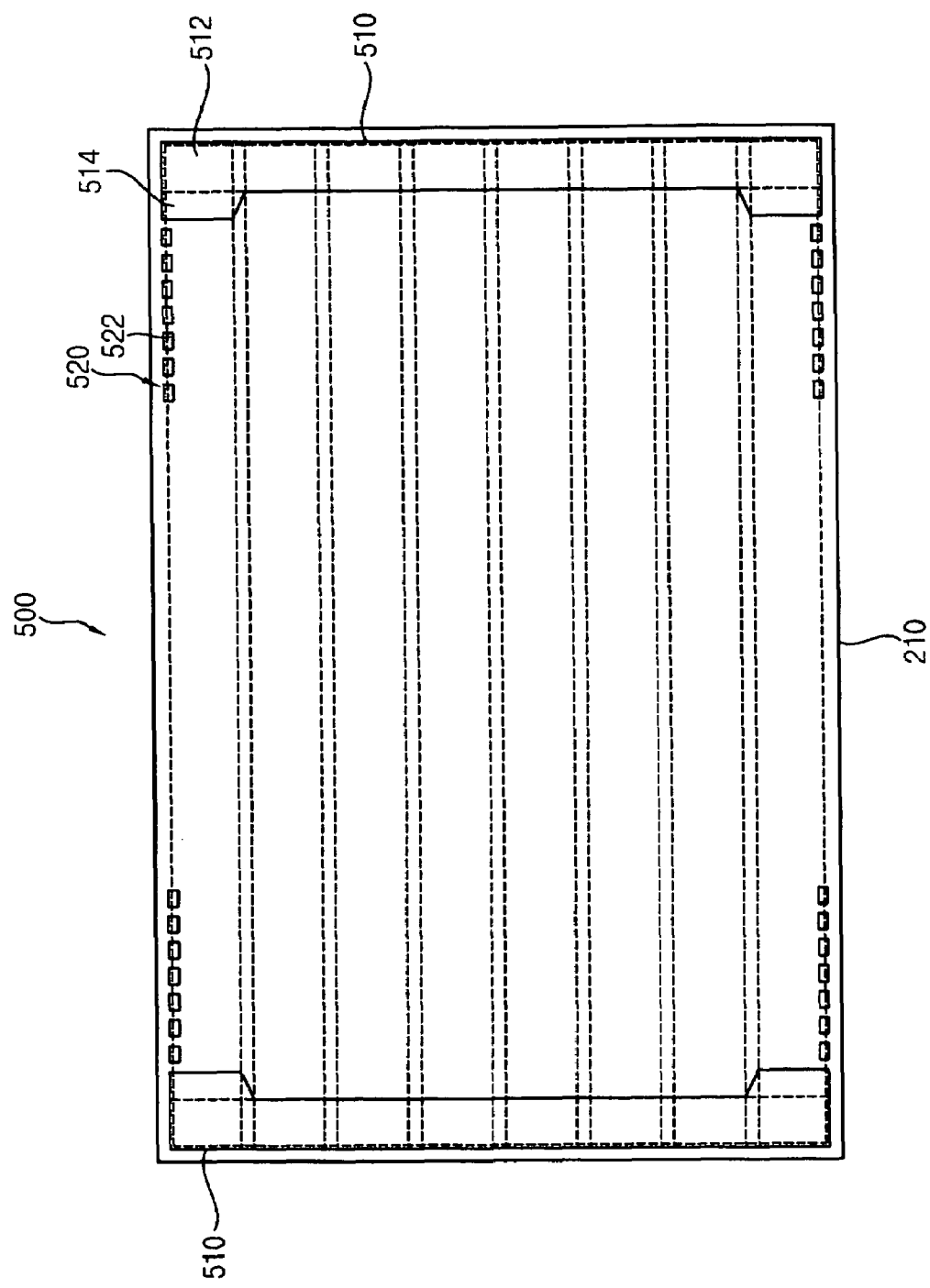
FIG. 7 is a plan view showing a flat-type fluorescent lamp in accordance with another exemplary embodiment of the present invention.
Figure 8:
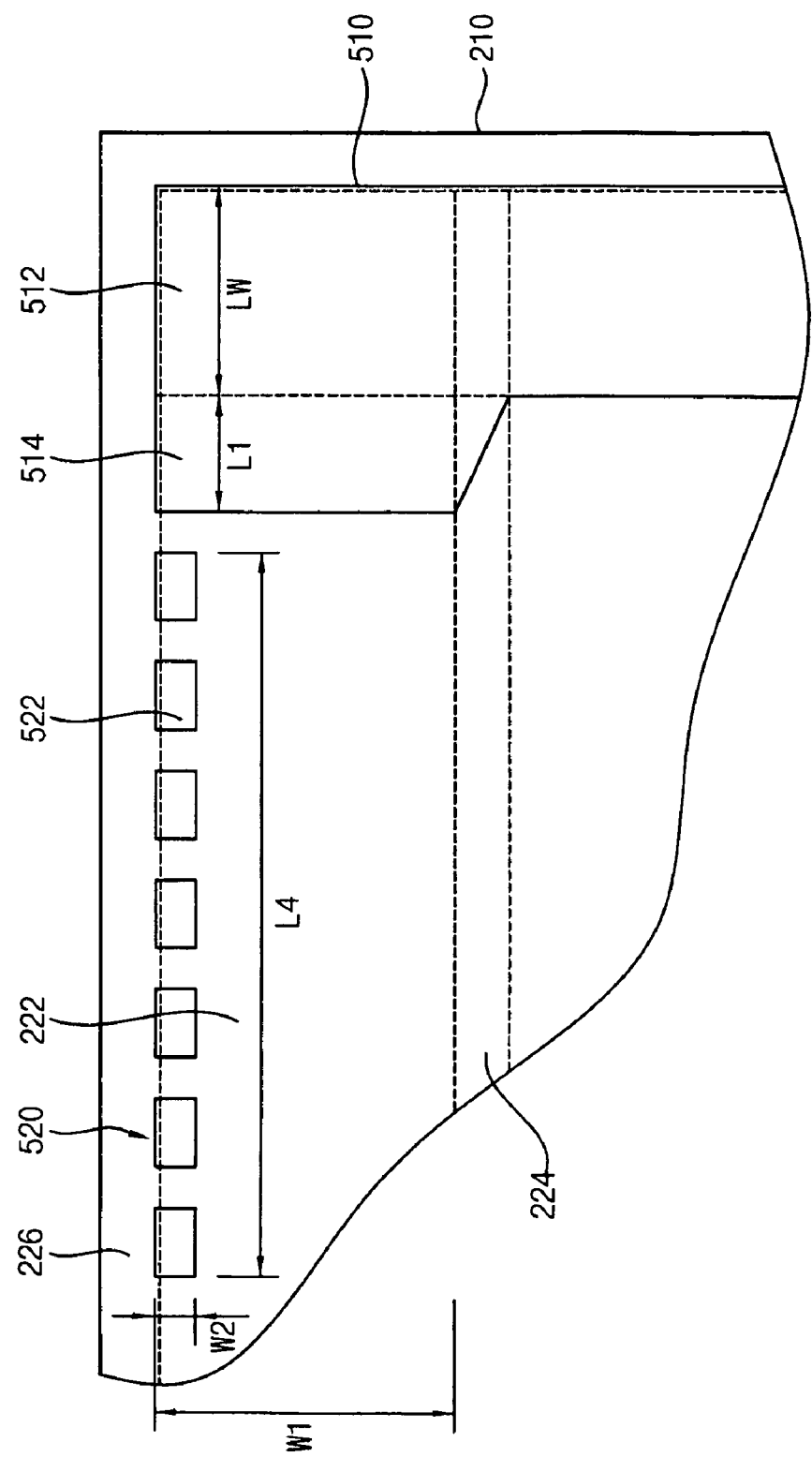
FIG. 8 is an enlarged plan view showing a first external electrode shown in FIG. 7.

FIG. 7 is a plan view showing a flat-type fluorescent lamp in accordance with another exemplary embodiment of the present invention. FIG. 8 is an enlarged plan view showing a first external electrode shown in FIG. 7. The flat-type fluorescent lamp of FIGS. 7 and 8 is substantially the same as in FIGS. 1 to 4 except with respect to the first external electrodes. Thus, the same reference numerals will be used to refer to the same or like parts as those described in FIGS. 1 to 4 and any further explanation concerning the above elements will be omitted.

Referring to FIGS. 7 and 8, the flat-type fluorescent lamp 500 includes first external electrodes 510 that are formed on a lower surface of the first substrate 210 and a floating electrode member 520.

Each of the first external electrodes 510 includes a main electrode portion 512 that crosses end portions of the discharge spaces, and a first auxiliary electrode portion 514 which protrudes from the main electrode portion 512.

The main electrode portion 512 crosses the end portions of the discharge spaces and extends in a direction substantially perpendicular to a longitudinal direction of each of the discharge spaces. The main electrode portion 512 has a uniform width LW. For example, the width LW of the main electrode portion 512 is about 10 mm.

The auxiliary electrode portion 514 corresponds to outer discharge spaces. The auxiliary electrode portion 514 protrudes from the main electrode portion 512 toward a center of each of the outer discharge spaces by a first length L1. As the first length L1 is increased, the luminance of light generated in the outer discharge spaces is also increased. However, when the first length L1 is too long, the light generated in the outer discharge spaces is blocked by the auxiliary electrode portion 514, thereby decreasing the luminance of the light generated from the outer discharge spaces. In this exemplary embodiment, the first length L1 is about 2 mm to about 3 mm. The first auxiliary electrode portion 514 has a width W1. In this exemplary embodiment, the width W1 of the auxiliary electrode portion 514 is about 10 mm.

The floating electrode member 520 is spaced apart from the auxiliary electrode portion 514, and extends in a direction substantially parallel to a longitudinal direction of each of the discharge spaces. The floating electrode member 520 includes a plurality of floating electrodes 522. The floating electrode member 520 has a fourth length L4. The fourth length L4 is long enough to decrease a lighting temperature of the flat-type fluorescent lamp 500. In this exemplary embodiment, the fourth length L4 is no less than about 20 mm. The floating electrode member 520 has a second width W2 that is shorter than the first width W1 of the auxiliary electrode portion 514. The floating electrode member 520 is adjacent to the sides of the flat-type fluorescent lamp 500. That is, the floating electrode member 520 is adjacent to a sealing portion 222.

The floating electrode member 520 comprises substantially the same material as the first external electrodes 510. Alternatively, the floating electrode member 520 and the first external electrodes 510 may comprise different materials. For example, the floating electrode member 520 may comprise a transparent conductive material so that the floating electrode member 520 will not block the light generated in the discharge spaces.

In this exemplary embodiment, the auxiliary electrode portion 514 is formed on the outermost discharge spaces. Alternatively, the auxiliary electrode portion 514 may be formed on two or three discharge spaces that are adjacent to the sides of the flat-type fluorescent lamp 500. In addition, the auxiliary electrode portion 514 may be formed on various other discharge spaces.

Figure 9:
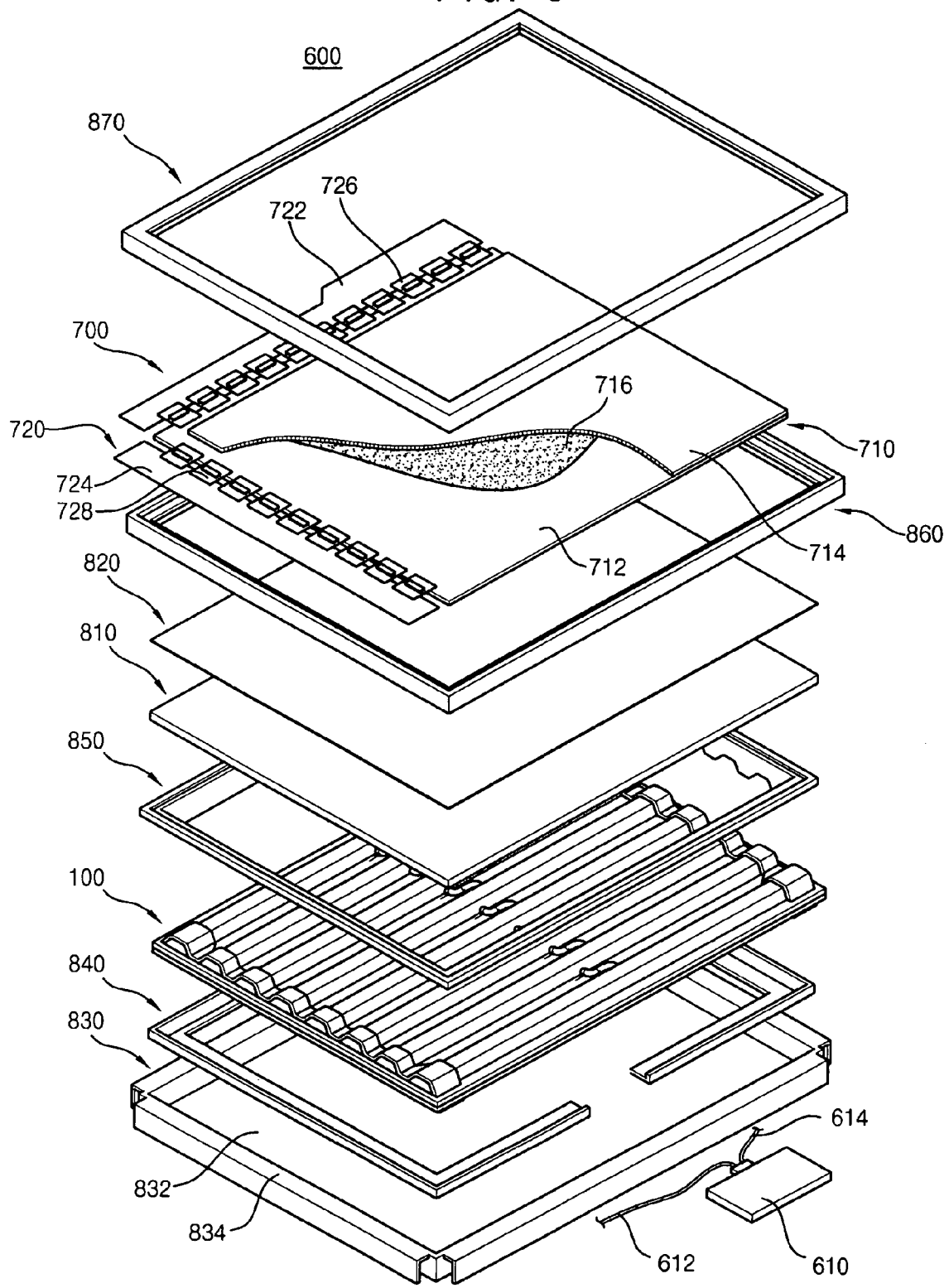
FIG. 9 is an exploded perspective view showing an LCD device in accordance with an exemplary embodiment.

FIG. 9 is an exploded perspective view showing an LCD device in accordance with an exemplary embodiment. A flat-type fluorescent lamp of FIG. 9 may be substantially the same as the lamps described above with respect to FIGS. 1 to 8. Thus, the same reference numerals will be used to refer to the same or like parts as those described in FIGS. 1 to 8 and any further explanation will be omitted.

Referring to FIG. 9, the LCD device 600 includes a flat-type fluorescent lamp 100 that generates light, a receiving container 830 that receives the flat-type fluorescent lamp 100, an inverter 610 that applies a discharge voltage to the flat-type fluorescent lamp 100, and a display unit 700 that displays an image.

The receiving container 830 comprises a strong metal to securely receive the flat-type fluorescent lamp 100. The receiving container 830 includes a bottom plate 832 and a plurality of sidewalls 834. The bottom plate 832 of the receiving container 830 corresponds to the lower surface of the flat-type fluorescent lamp 100. The sidewalls 834 of the receiving container 830 correspond to side surfaces of the flat-type fluorescent lamp 100. In this exemplary embodiment, each of the sidewalls 834 is bent twice to form a combining space for combining the sidewalls 834 with other elements such as a top chassis, a molded frame, etc. The outer discharge spaces of the flat-type fluorescent lamp 100 are positioned adjacent to the bottom plate 832 and the sidewalls 834 of the receiving container 830. The remaining inner discharge spaces of the flat-type fluorescent lamp 100 are only adjacent to the bottom plate 832 of the receiving container 830. Therefore, a parasitic capacitance formed on each of the outer discharge spaces is larger than that of the inner discharge spaces.

The inverter 610 generates a discharge voltage to drive the flat-type fluorescent lamp 100. The inverter 610 elevates a level of a voltage that is provided by an external source to drive the flat-type fluorescent lamp 100. The discharge voltage is applied to the first and second external electrodes 310 and 320 through a first power supply line 612 and a second power supply line 614, respectively. In this exemplary embodiment, the first and second external electrodes 310 and 320 are provided on the first and second substrates 210 and 220, respectively, and a first conductive clip (not shown) and a second conductive clip (not shown) are electrically connected to the first and second power supply lines 612 and 614, respectively. Each of the first and second conductive clips (not shown) electrically connects the first and second external electrodes 310 and 320 with each other.

The display unit 700 includes an LCD panel 710 and a driving circuit member 720. The LCD panel 710 displays an image using the light generated from the flat-type fluorescent lamp 100. The driving circuit member 720 applies driving signals to the LCD panel 710.

The LCD panel 710 includes a first substrate 712, a second substrate 714 and a liquid crystal layer 716. The second substrate 714 is aligned with the first substrate 712. The liquid crystal layer 716 is interposed between the first and second substrates 712 and 714.

The first substrate 712 is a thin film transistor (TFT) substrate having a plurality of TFTs that are arranged in a matrix shape. For example, the first substrate 712 may comprise a glass substrate. A source electrode of each of the TFTs is electrically connected to a data line. A gate electrode of each of the TFTs is electrically connected to a gate line. A drain electrode of each of the TFTs is electrically connected to a pixel electrode that comprises a transparent conductive material.

The second substrate 714 may comprise a color filter substrate. For example, the second substrate 714 may comprise a glass substrate. The second substrate 714 has a common electrode (not shown) that comprises a transparent conductive material.

When electric power is applied to the gate electrode of each of the TFTs, the TFT is turned on and an electric field is formed between the pixel electrode (not shown) and the common electrode (not shown). Therefore, an orientation of the liquid crystals in the liquid crystal layer 716 between the first and second substrates 712 and 714 is changed by the electric field applied to the liquid crystal layer 716. Thus, a light transmittance of the liquid crystal layer 716 is changed, thereby causing an image having a predetermined gray-scale to be displayed.

The driving circuit member 720 includes a data printed circuit board (PCB) 722, a gate PCB 724, a data flexible circuit film 726, and a gate flexible film 728. The data PCB 722 applies a data driving signal to the LCD panel 710. The gate PCB 724 applies a gate driving signal to the LCD panel. The data flexible circuit film 726 electrically connects the data PCB 722 to the LCD panel 710. The gate flexible circuit film 728 electrically connects the gate PCB 724 to the LCD panel 710. Each of the data and gate flexible circuit films 726 and 728 may comprise a tape carrier package (TCP) or a chip on film (COF).

The data flexible circuit film 726 is bent so that the data PCB 722 is positioned along a side surface or a rear surface of the receiving container 830. The gate flexible circuit film 728 is also bent so that the gate PCB 724 is positioned along the side surface or the rear surface of the receiving container 830. Alternatively, an auxiliary signal line is formed on the LCD panel 710 and the gate flexible circuit film 728 so that the gate PCB 724 may be omitted.

The LCD device 600 further includes a light diffusion plate 810 and at least one optical sheet 820. The light diffusion plate 810 is positioned on the flat-type fluorescent lamp 100 to diffuse the light generated by the flat-type fluorescent lamp 100. The optical sheet 820 is positioned on the diffusion plate 810.

The diffusion plate 810 diffuses the light generated from the flat-type fluorescent lamp 100 to create a uniform luminance of light. The diffusion plate 810 comprises a plate shape having a predetermined thickness. The diffusion plate 810 is spaced apart from the flat-type fluorescent lamp 100 by a predetermined distance. The diffusion plate 810 comprises a transparent material and a diffusing agent. In this exemplary embodiment, the diffusing agent comprises polymethyl methacrylate (PMMA).

The optical sheet 820 guides a light path of the light that has passed through the diffusion plate 810. The optical sheet 820 may comprise a bright enhancement film (BEF) that improves a luminance when viewed from a front of the LCD panel 700. Alternatively, the optical sheet 820 may further comprise a diffusion sheet for further diffusing the diffused light that has passed through the diffusion plate 810. The LCD device 600 may further include various optical sheets.

The LCD device 600 may further include a cushioning member 840 interposed between the flat-type fluorescent lamp 100 and the receiving container 830 to support the flat-type fluorescent lamp 100. The cushioning member 840 is positioned adjacent to sides of the flat-type fluorescent lamp 100 so that the flat-type fluorescent lamp 100 is spaced apart from the receiving container 830 by a predetermined distance, thereby electrically insulating the flat-type fluorescent lamp 100 from the receiving container 830 that has a metal. The cushioning member 840 contains insulating material. In addition, the cushioning member 840 may comprise an elastic material. For example, the cushioning member 840 may comprise silicon. In this exemplary embodiment, the cushioning member 840 comprises two U-shaped pieces. Alternatively, the cushioning member 840 may comprise four linear pieces corresponding to the four sides of the flat-type fluorescent lamp 100. The cushioning member 840 may comprise four L-shaped pieces corresponding to four corners of the flat-type fluorescent lamp 100, respectively. Alternatively, the cushioning member 840 may comprise one frame shaped cushioning member 840.

The LCD device 600 may further include a first molded frame 850 interposed between the flat-type fluorescent lamp 100 and the diffusion plate 810.

The first molded frame 850 fixes sides of the flat-type fluorescent lamp 100, and supports sides of the diffusion plate 810. In this exemplary embodiment, the first molded frame 850 has a frame shape. Alternatively, the first molded frame 850 may comprise two U-shaped pieces, two L-shaped pieces corresponding to corners of the flat-type fluorescent lamp 100, or four linear pieces corresponding to the sides of the flat-type fluorescent lamp 100.

The LCD device 600 may further include a second molded frame 860 interposed between the optical sheet 820 and the LCD panel 710. The second molded frame 860 fixes sides of the optical sheet 820 and the diffusion plate 810, and supports the sides of the LCD panel 710. In this exemplary embodiment, the second molded frame 860 has a frame shape. Alternatively, the second molded frame 860 may comprise two U-shaped pieces, two L-shaped pieces, or four pieces corresponding to the sides of the flat-type fluorescent lamp 100.

The LCD device 600 may further include a top chassis 870 to fix the display unit 700. The top chassis 870 is combined with the receiving container 830 to fix the sides of the LCD panel 710. The data PCB 722 is bent by the data flexible circuit film 726 to be fixed on the sidewalls or the bottom plate of the receiving container 830. The top chassis 870 may comprise a strong metal.

In accordance with the present invention, the first external electrode comprise an auxiliary electrode portion on the outermost discharge spaces so that the luminance of the outer discharge spaces is increased, thereby providing luminance uniformity for the display and improving an image display quality of the flat-type fluorescent lamp.

In addition, the floating electrode member is formed on the outer discharge spaces so that the flat-type fluorescent lamp may be operated at a low temperature.

Furthermore, the first external electrode may comprise a second auxiliary electrode portion to enhance performance of the flat-type fluorescent lamp.

This invention has been described with reference to the exemplary embodiments. It is evident, however, that many alternative modifications and variations will be apparent to those having skill in the art in light of the foregoing description. Accordingly, the present invention embraces all such alternative modifications and variations which fall within the spirit and scope of the appended claims.

What is claimed is:

1. A flat-type fluorescent lamp comprising:
   a lamp body including a plurality of longitudinal discharge spaces for generating light;
   first external electrodes at opposite ends of the lamp body between which a discharge voltage is applied, each first external electrode comprising:
   a main electrode portion adjacent to end portions of the discharge spaces; and
   a first auxiliary electrode portion protruding from the main electrode portion toward an opposite end of the discharge spaces, the first auxiliary electrode portion being positioned on the same plane as the main electrode portion, wherein the first external electrode further comprises a second auxiliary electrode portion longitudinally protruding from the first auxiliary electrode, the second auxiliary electrode portion having a smaller width than the first auxiliary electrode portion, and wherein the second auxiliary electrode portion is adjacent to the side of the lamp body, and wherein the width of the second auxiliary electrode portion is no more than about 2 mm.

2. The flat-type fluorescent lamp of claim 1 further comprising a floating electrode member spaced apart from the second auxiliary electrode portion, the floating electrode member extending in a direction parallel to a longitudinal direction of the second auxiliary electrode portion.

3. The flat-type fluorescent lamp of claim 2, wherein the floating electrode member comprises a plurality of floating electrodes that are spaced apart from one another.

4. The flat-type fluorescent lamp of claim 2, wherein the second auxiliary electrode portion and the floating electrode member comprise a transparent conductive material.

5. The flat-type fluorescent lamp of claim 2, wherein the floating electrode member is formed on an outer surface of the lamp body.

6. The flat-type fluorescent lamp of claim 1, wherein the lamp body comprises:
 a first substrate, said first external electrode being positioned on an external surface the first substrate; and
 a second substrate combined with the first substrate to form the discharge spaces between the first substrate and the second substrate.

7. The flat-type fluorescent lamp of claim 6,
 wherein the second substrate is a unitary substrate which defines a plurality of discharge space portions spaced apart from the first substrate contacting the first substrate to define sides of the discharge spaces.

8. The flat-type fluorescent lamp of claim 7, further comprising a second external auxiliary electrode portion adjacent to the sealing portion.

9. The flat-type fluorescent lamp of claim 6, further comprising a second external electrode on the second substrate, said second external electrode being aligned with the main electrode portion and the first auxiliary electrode portion.

10. The flat-type fluorescent lamp of claim 1, further comprising:
 a first fluorescent layer provided on the first substrate;
 a second fluorescent layer provided on the second substrate facing the first fluorescent layer; and
 a reflecting layer between the first substrate and the first fluorescent layer.

11. A flat-type fluorescent lamp comprising:
 a lamp body including a plurality of discharge spaces for generating light; and a first external electrode on an end portion of the lamp body through which a discharge voltage is applied, the first external electrode comprising:
 a main electrode portion adjacent to end portions of the discharge spaces;
 an auxiliary electrode portion protruding from the main electrode portion toward an opposite end of the discharge spaces, the auxiliary electrode portion being positioned on the same plane as the main electrode to correspond to an outer discharge space adjacent to a side of the lamp body; and
 a floating electrode member spaced apart from the auxiliary electrode portion, the floating electrode member having a shorter width than the auxiliary electrode portion.

12. The flat-type fluorescent lamp of claim 11, wherein the floating electrode member is adjacent to a side of the lamp body.

13. The flat-type fluorescent lamp of claim 12, wherein the floating electrode member comprises a plurality of floating electrodes.

14. The flat-type fluorescent lamp of claim 12, wherein the floating electrode member is formed on an outer surface of the lamp body.

15. The flat-type fluorescent lamp of claim 12, wherein the lamp body comprises: a first substrate, said first external electrode being positioned on the first substrate; and a second substrate combined with the first substrate to form the discharge spaces between the first substrate and the second substrate, the second substrate comprising:
 a plurality of discharge space portions spaced apart from the first substrate to form the discharge spaces;
 a plurality of space dividing portions between the discharge space portions, the space dividing portions contacting the first substrate to define sides of the discharge spaces; and
 a sealing portion surrounding the discharge space portions and the space dividing portions, the sealing portion combining the first substrate with the second substrate.

16. The flat-type fluorescent lamp of claim 15, further comprising a second external electrode on the second substrate corresponding to the main electrode portion and the auxiliary electrode portion.

17. A liquid crystal display device comprising:
 a flat-type fluorescent lamp including: a lamp body including a plurality of discharge spaces for generating light; and first external electrodes on end portion of the lamp body through which a discharge voltage is applied, the first external electrode comprising:
 a main electrode portion adjacent to end portions of the discharge spaces; and
 a first auxiliary electrode portion protruding from the main electrode portion toward an opposite end of the discharge spaces, the first auxiliary electrode portion being positioned on the same plane as the main electrode portion to correspond to an outer discharge space adjacent to a side of the lamp body;
 a receiving container receiving the flat-type fluorescent lamp;
 an inverter that applies a discharge voltage to the flat-type fluorescent lamp; and
 a liquid crystal display panel that displays an image using the light generated by the flat-type fluorescent lamp,
 wherein the first external electrode further comprises a second auxiliary electrode portion longitudinally protruding from the first auxiliary electrode, the second auxiliary electrode portion having a smaller width than the first auxiliary electrode portion, and
 wherein the second auxiliary electrode portion is adjacent to the side of the lamp body, and
 wherein the width of the second auxiliary electrode portion is no more than about 2 mm.

18. The liquid crystal display device of claim 17, wherein the first external electrode further comprises a second auxiliary electrode portion protruding from the first auxiliary electrode, the second auxiliary electrode portion having a smaller width than the first auxiliary electrode portion.

19. The liquid crystal display device of claim 18, wherein the second auxiliary electrode portion is adjacent to the side of the lamp body.

20. The liquid crystal display device of claim 19, further comprising a floating electrode member spaced apart from the second auxiliary electrode portion, the floating electrode member being arranged in a direction substantially in parallel with a longitudinal direction of the second auxiliary electrode portion.

21. The liquid crystal display device of claim 20, wherein the floating electrode member comprises a plurality of floating electrodes.

22. The liquid crystal display device of claim 17, wherein the receiving container comprises:
   a bottom plate corresponding to a lower surface of the lamp body having the first external electrode; and
   a sidewall protruding from a side of the bottom plate, the sidewall corresponding to a side surface of the lamp body.

23. The liquid crystal display device of claim 17, wherein the lamp body comprises: a first substrate, the first external electrode being positioned on the first substrate; and a second substrate combined with the first substrate to form the discharge spaces between the first substrate and the second substrate, the second substrate comprising: a plurality of discharge space portions spaced apart from the first substrate to form the discharge spaces; a plurality of space dividing portions between the discharge space portions, the space dividing portions contacting the first substrate to define sides of the discharge spaces; and a sealing portion surrounding the discharge space portions and the space dividing portions, the sealing portion combining the first substrate with the second substrate.

24. The liquid crystal display device of claim 23, wherein the flat-type fluorescent lamp further comprises a second external electrode that corresponds to the main electrode portion and the first auxiliary electrode portion.

25. The liquid crystal display device of claim 17, further comprising: a diffusion plate on the flat-type fluorescent lamp to diffuse the light generated from the flat-type fluorescent lamp; and at least one optical sheet on the diffusion plate.

26. The liquid crystal display device of claim 25, further comprising: a cushioning member interposed between the receiving container and the flat-type fluorescent lamp to support the flat-type fluorescent lamp; a first molded frame that fixes the flat-type fluorescent lamp and supports the diffusion plate; and a second molded frame that fixes the diffusion plate and the optical sheet and supports the liquid crystal display panel.

* * * * *